(12) United States Patent
Bakshi

(10) Patent No.: US 8,031,872 B2
(45) Date of Patent: *Oct. 4, 2011

(54) PRE-EXPIRATION PURGING OF AUTHENTICATION KEY CONTEXTS

(75) Inventor: Sanjay Bakshi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1374 days.

This patent is subject to a terminal disclaimer.

(21) Appl. No.: 11/329,911

(22) Filed: Jan. 10, 2006

(65) Prior Publication Data

US 2007/0165858 A1 Jul. 19, 2007

(51) Int. Cl.
*H04K 1/00* (2006.01)
(52) U.S. Cl. ........................................ 380/247
(58) Field of Classification Search .................. 380/247, 380/270, 272; 455/421
See application file for complete search history.

(56) References Cited

U.S. PATENT DOCUMENTS

| | | | | |
|---|---|---|---|---|
| 6,141,566 | A * | 10/2000 | Gerdisch et al. | 455/562.1 |
| 7,155,222 | B1 * | 12/2006 | Jain et al. | 455/435.1 |
| 2001/0029181 | A1 * | 10/2001 | Verkama | 455/426 |
| 2002/0154776 | A1 * | 10/2002 | Sowa et al. | 380/247 |
| 2003/0080959 | A1 * | 5/2003 | Morein | 345/422 |
| 2003/0149666 | A1 * | 8/2003 | Davies | 705/50 |
| 2003/0157966 | A1 * | 8/2003 | Sato et al. | 455/561 |
| 2003/0226017 | A1 | 12/2003 | Palekar et al. | |
| 2005/0159161 | A1 * | 7/2005 | Florkey et al. | 455/450 |
| 2006/0052117 | A1 * | 3/2006 | Katsube et al. | 455/458 |
| 2006/0215695 | A1 * | 9/2006 | Olderdissen | 370/469 |
| 2007/0064647 | A1 | 3/2007 | Prasad | |
| 2007/0160211 | A1 * | 7/2007 | Bakshi | 380/247 |
| 2007/0165858 | A1 | 7/2007 | Bakshi | |
| 2008/0019527 | A1 * | 1/2008 | Youn et al. | 380/278 |

FOREIGN PATENT DOCUMENTS

| | | |
|---|---|---|
| EP | 1 077 579 A1 | 2/2001 |
| EP | 1521402 A2 | 4/2005 |
| EP | 1705939 A1 | 9/2006 |
| WO | WO 00/30393 | 5/2000 |
| WO | WO 03/096712 A1 | 11/2003 |

OTHER PUBLICATIONS

Michel Barbeau, WiMax/802.16 Threat Analysis, Oct. 13 2005, Q2Winet'05, pp. 8-15.*

(Continued)

*Primary Examiner* — Edan Orgad
*Assistant Examiner* — Brian Olion
(74) *Attorney, Agent, or Firm* — Schwabe, Williamson & Wyatt, P.C.

(57) ABSTRACT

Various embodiments of methods and apparatuses for managing authentication key contexts are described herein. In various embodiments, the methods and apparatuses include selective purging of authentication key contexts of supplicants even if their authentication keys have not expired.

11 Claims, 4 Drawing Sheets

OTHER PUBLICATIONS

International Search Report for International Application No. PCT/US2007/000820 issued by the European Patent Office on May 16, 2007, pp. 1-5.

Anonymous, EXTRACT from: IEEE P802.16e/D12, Draft IEEE Standard for Local and metropolitan area networks, Part 16: Air Interface for Fixed and Mobile Broadband Wireless Access Systems,: Oct. 14, 2005, pp. 186-260, XP002435176.

Harkins, Dan, "Caching PMKs," IEEE 802.11-03/421r0 Submission, May 2003, pp. 1-8, XP002435177.

International Search Report for International Application No. PCT/US2007/000808, issued by the European Patent Office on Jun. 12, 2007, pp. 1-6.

Michael Barbeau, WiMax/802.16 Threat Analysis, Oct. 13, 2005, Q2Winet'05, pp. 8-15.

David Johnston and Jesse Walker, Overview of IEEE 802.16 Security, Jun. 2004, IEEE Computer Society, vol. 2, issue 3, pp. 40-48.

* cited by examiner

US 8,031,872 B2

PRE-EXPIRATION PURGING OF AUTHENTICATION KEY CONTEXTS

BACKGROUND

1. Technical Field

Embodiments of the present invention are related to the fields of data processing and data communication, and in particular, to wireless networking.

2. Description of Related Art

An Institute of Electrical and Electronic Engineers (IEEE) 802.11e standard (approved 2005, IEEE Standards Board, Piscataway, N.Y.), among other things, define aspects of Worldwide Inoperability for Microwave Access (WiMAX) for Wireless Metropolitan Area Networks (MANs). Among the functionalities supported by WiMAX is high-speed seamless handoff (HO) of Mobile Subscriber Station (MSS) from one Base Station (BS) to another, that does not compromise subscriber or network security.

In order to support high-speed secure HO model, an automatic key-derivation for HO was defined in which an authentication key (AK) for target base stations (BS) is derived prior to HO by both the target BS and MSS while still connected to the source BS. Thus, MSS can HO without the need to perform lengthy authentication, authorization and accounting (AAA) session and skipping the major time-consuming phase of connecting to a new BS, leading to the low latency HO that is both seamless and secure.

Typically, the mechanism of deriving AK automatically from a parent key (Pairwise Master Key—PMK) creates a fresh context called AK Context for this derived AK at both the BS and MSS. A fresh AK context can be derived only once (per BS and PMK) and is used until the key (PMK) is expired in order to maintain security (If a fresh context will be created twice for the same AK—it is a security hole that allows reply attacks). Per WiMAX, the default implementation is to cache the AKs and AK Contexts till the corresponding PMK is no longer valid (i.e. expired) which can be several days in most networks. This can lead to BS's caching a large number of AKs and AK Contexts belonging not only to MSSs currently active in the network but also MSS that had joined and left the network but still have valid PMKs. Since PMKs can be cached for few days, the number PMKs, AKs and AK Contexts that can be cached is potentially quite large, leading to long searches and large memory requirements in BS leading to a costly BS.

DETAILED DESCRIPTION OF ILLUSTRATIVE EMBODIMENTS

In the following description, for purposes of explanation, numerous details are set forth in order to provide a thorough understanding of the disclosed embodiments of the present invention. However, it will be apparent to one skilled in the art that these specific details are not required in order to practice the disclosed embodiments of the present invention. In other instances, well-known electrical structures and circuits are shown in block diagram form in order not to obscure the disclosed embodiments of the present invention.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation. One or more of these operations may be performed in parallel and/or in a different order.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
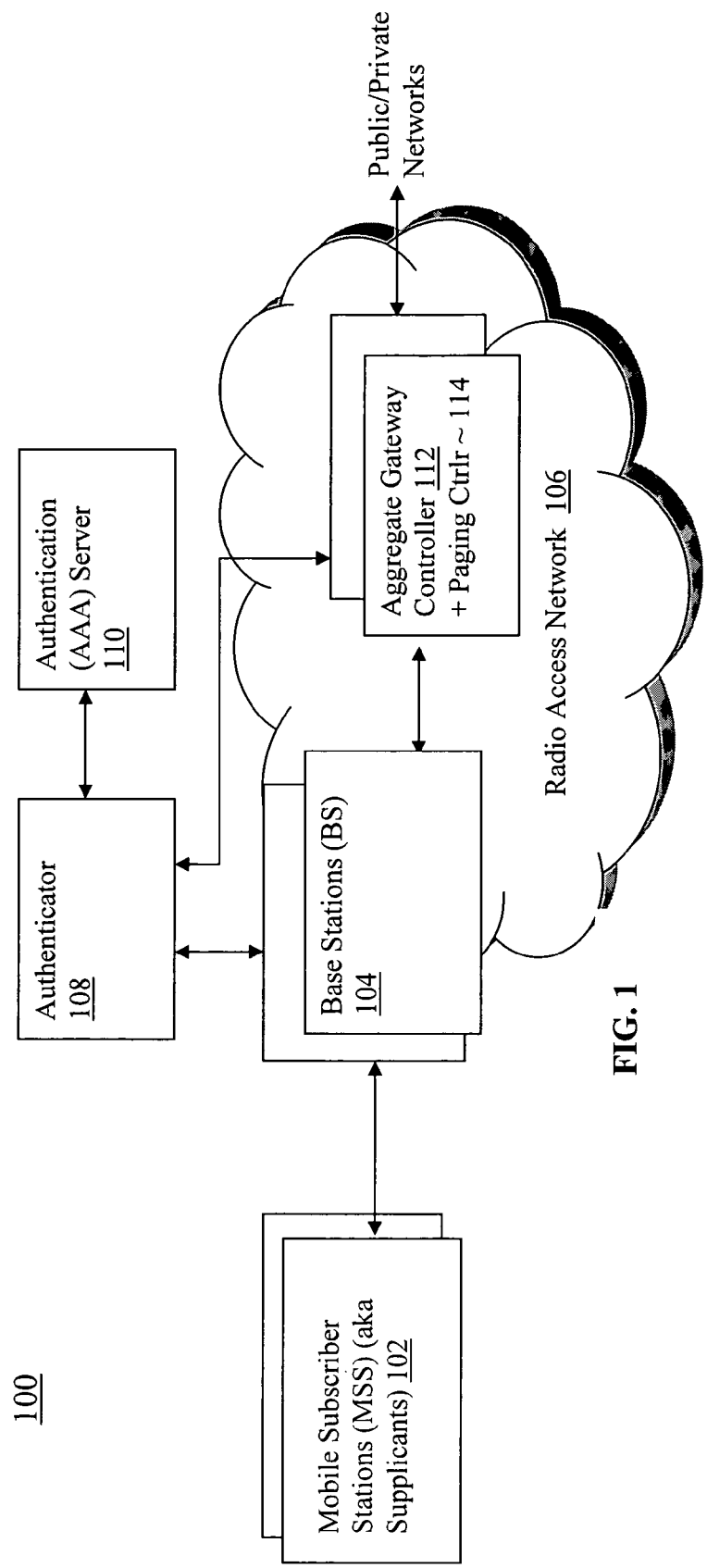
FIG. 1 illustrates an example wireless MAN suitable for practicing the present invention.

With reference to FIG. 1, there is illustrated a wireless MAN 100, suitable for practice the present invention, in accordance various embodiments. While illustrative embodiments of the present invention will be described in the context of wireless MAN 100, the present invention is not so limited, it is anticipated that it may be practiced in any wide area networks (WAN) without regard to the size of the area covered by the networks, in particular, the size of the area covered by the network is not limited to the size of a typical metropolitan area. Embodiments of the present invention may also be practiced with wireless local area networks (WLAN) as well.

For the embodiments, wireless MAN 100 includes a number of MSSs 102 communicatively coupled to BSs 104, which in turn are selectively coupled to a number of Aggregate Gateway Routers (AGR) 112, as shown. Each MSS 102 is coupled to radio access network (RAN) 106 through one of the BSs 104 and AGR 112, to access various private and public networks, such as the Internet, after MSSs 102 have been authenticated as being eligible to access network 106.

In various embodiments, MSSs 102 may be a laptop computer, a personal computer, a portable hand-held computer, a personal digital assistant, or like device. In various embodiments, BSs 104 are geographically dispersed, with each BS 104 servicing MSSs 102 in its coverage area, in particular, implementing media access control (MAC) and radio physical layer (PHY) functions, and providing radio coverage for MSSs 102 in its coverage area.

In various embodiments, each AGR 112 services a number of BSs 104. Typically, each AGR 112 may be an IP router that hosts centralized control functions, including e.g. Paging Controller 114. The BSs 104 and AGRs 112 together define the RAN. The AGRs 112 connect the RAN to one or more IP core networks, providing connectivity to the private and public networks, such as the Internet.

In various embodiments, wireless MAN 100 further includes at least an authenticator 108 and an authentication server 110, coupled to each other, BSs 104 and AGRs 112 as shown, to facilitate authentication of MSSs 102. In various embodiments, an authenticator 108 of a MSS 102 and BS 104 pair may be integrated with the BS 104.

In various embodiments, the authentication is based upon Internet Engineering Task Force (IETF)'s Extensible Authentication Protocol (EAP) 3-party model which consists of a "Supplicant", an "Authenticator" and an "Authentication Server". In alternate embodiments, other authentication protocols may be practiced. Under EAP, a Supplicant is an entity at one end of a point-to-point link, such as a MSS 102, that is being authenticated by an authenticator attached to the other end of that link, such as Authenticator 108. Authenticator 108 enforces authentication before allowing access to services that are accessible to the Supplicant. Authentication Server 110 provides authentication service to Authenticator 108. This service determines from the credentials provided by the Supplicant whether the Supplicant is authorized to access the services provided via the authenticator. An AAA backend server is an example of authentication server.

In order to establish end-to-end communications between Supplicant and Authentication server, the three-party model uses EAP, an encapsulation protocol, to transport the protocol data units (PDUs) related to the authentication method being used between Supplicant and Authentication Server across the network. Upon successful authentication, both Supplicant 102 and Authentication Server 110 generate mutual keying material (AK) representing the session. Authentication Server 110 transfers the generated key to the Authenticator 108 associated with the BS 104 via which MSS 102 is connected, so the MSS 102 is allowed into the network 106 and provided services per its subscription policy.

Further, the authentication includes Authenticator 108 creating and maintaining AK contexts of the AKs for the various MSS 102. Still further, to facilitate high speed HO of MSS 102 from one BS 104 to another 104, as MSS 102 moves from one coverage area to another, Authenticator 108 as well as BS 104 caches the AK contexts of the various MSS 102. However, for the embodiments, at least one of Authenticator 108 and BSs 104 is configured to aggressively purge some of the AK contexts, even before the corresponding AKs have expired, if one or more purging policies are met, to reduce the storage requirement of the Authenticator 108 and/or BSs 104, and to reduce the search time for accessing AK contexts.

As will be described in more detail below, in various embodiments, the one or more purging policies include a purging policy of purging the AK context of an AK of a MSS 102, if the MSS is to be considered as having left the coverage areas serviced by BSs 104. In various embodiments, BSs 104 is configured to utilize Paging Controller 114 to determine whether a MSS 102 should be considered as having left the coverage areas serviced by BSs 104. Paging Controller 114 in turn informs Authenticator 108 of the result of the determination, which in turn informs the BSs 104.

In alternate embodiments, determination of whether a MSS 102 should be considered as having left the coverage areas (hereinafter, simply "determined to have left the coverage areas"), may be performed in other manners, using other controllers beside Paging Controller 112 of network 106, or by BSs 104 and/or authenticator 108 itself. Requesting of the determination may be made indirectly, e.g. through Authenticator 108. In still other embodiments, the one or more purging policies may include one or more other policies calculated to balance the benefits from aggressively purging the AK contexts even before the corresponding AKs have expired versus the potential costs for being in error and having to reestablish the AK contexts for the AKs of the MSSs 102.

Figure 2:
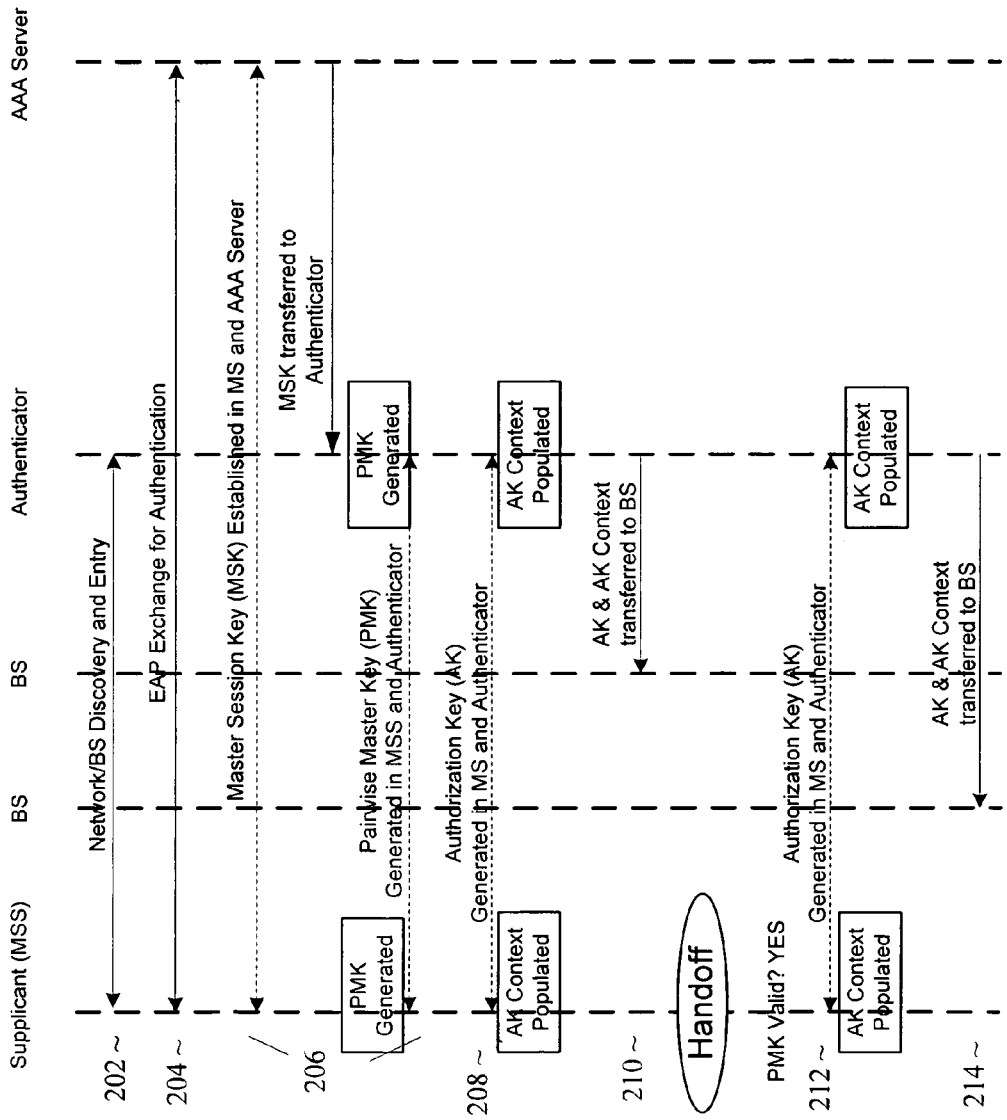
FIG. 2 illustrates AK generation and HO in the wireless MAN of FIG. 1, in accordance with various embodiments.

FIG. 2 illustrates AK generation and high speed HO in accordance with various embodiments in further detail. At 202 (Network/BS Discovery and Entry), a MSS 102 discovers the available BSs 104 in a coverage area, and selects a BS 104 for communication based on some policy, statically and/or dynamically discovered configuration data. Upon network entry, EAP exchange for authentication is triggered between MSS 102 and AAA Server 110.

At 204 (EAP Exchange for Authentication), MSS 102 and AAA Server 110 conduct an EAP exchange during which MSS 102 presents its credentials to the AAA Server 110 for authentication and access to network 106.

At 206 (Shared Master Session Key (MSK) establishment), as part of the successful EAP exchange in 204, a Master Session Key (MSK) is established at MSS 102 and AAA Server 110. AAA Server 110 then transfers the generated MSK to Authenticator 108. At this time, both MSS 102 and Authenticator 108 generate a PMK. At this stage, the authentication part of the authorization flow (and the involvement of the generic EAP layer) is complete.

At 208 (AK and AK Context generation), Authenticator 108 and MSS 102 generate AK and populate AK Context based on algorithm(s) selected by the Network (106) operator.

At 210 (AK and AK Context Transfer), Authenticator 108 delivers AK and its AK context to the serving BS 104. Further, both Authenticator 108 and BS 104 cache the AK and the AK context related to the MSS 102.

At 212 (Processing upon Handoff), when HO is initiated to another BS 104 and as long as the PMK is valid, another AK and AK Context are generated by both MSS 102 and Authenticator 108. Likewise the new AK and AK Context are cached by both MSS 102 and Authenticator 108.

As can be observed, while PMK is valid, an MSS 102 can HO to several BSs 104 thereby causing each BS 104 to cache AK and AK Context. This cached state will stay in the BS cache as long as the corresponding PMK is valid even after the MSS 102 has long left the network. Since PMK lifetime is usually of the order of several days, BS 104 will end up caching AK and AK Context pairs for all the MSS 102 that have visited it during last several days, which is a lot of cached information thus leading to lengthy searches that are keyed by MSS 102 and higher memory requirement in the BS 104.

As described earlier, in various embodiments, at least one BS 104 and Authenticator 108 is configured to aggressively purge the cached AK Context when one or more purging policies are satisfied, even if the corresponding AKs have not expired, to reduce the number of AK Context cached, and in term the memory requirement and search time. In various embodiments, all BS 104 and Authenticator 108 are configured to aggressively purge the cached AK Context when one or more purging policies are satisfied, even if the corresponding AKs have not expired.

Figure 3:
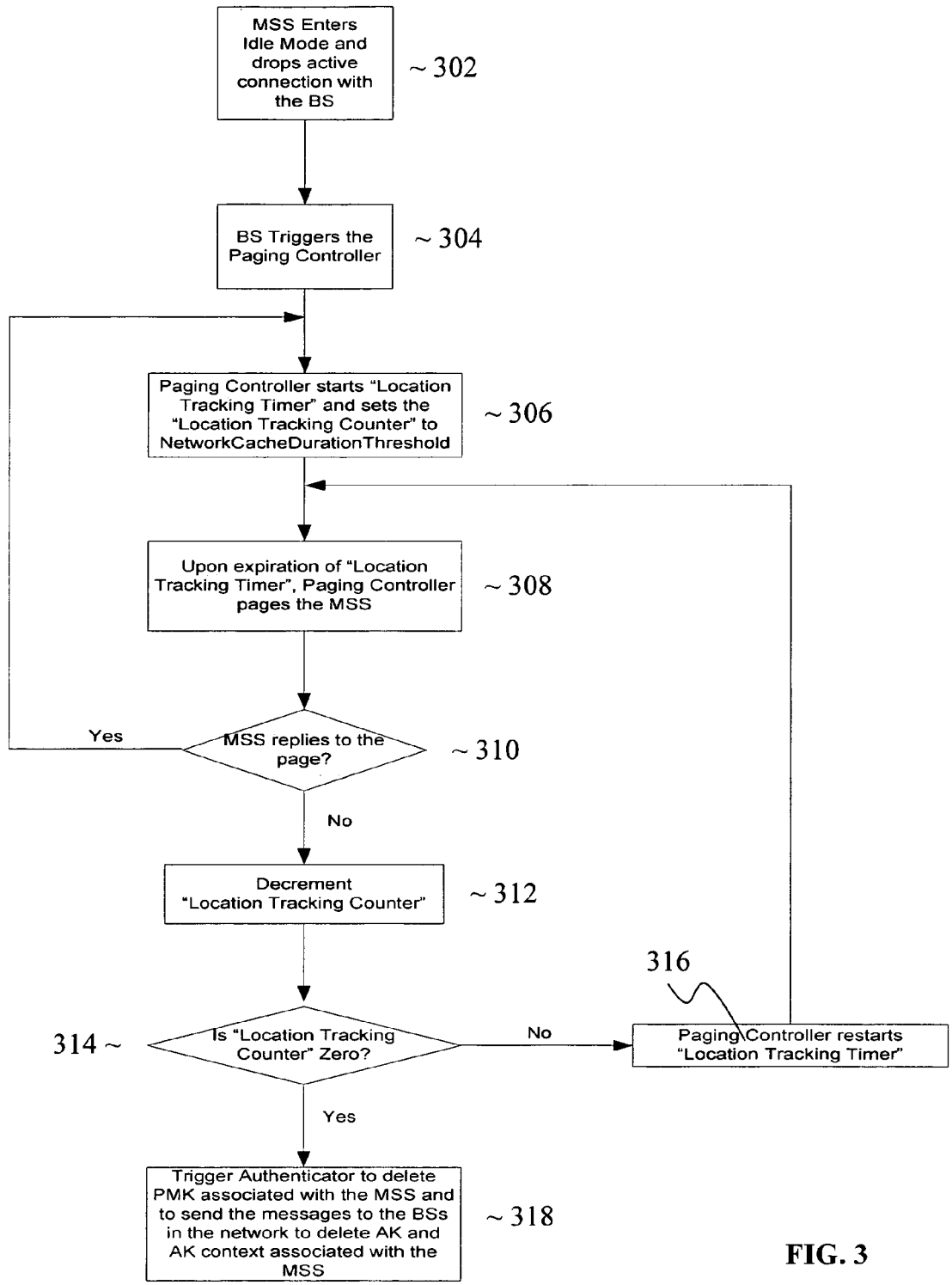
FIG. 3 illustrates a method of the present invention, including pre-expiration purging of AK contexts, in accordance with various embodiments of the present invention.

FIG. 3 illustrates a method of the invention, in accordance with various embodiments. As illustrated, for the embodiments, the method starts on a BS 102 at 302 when a MSS 102 enters an Idle Mode, and drops its active connection with the BS 102. In response, BS 102 starts at 304 to determine whether the one or more purging policies for purging the AK Context of the MSS 102 are met. More specifically, for the embodiments, BS 102 triggers the Paging Controller 114 to determine whether the one or more purging policies are met, in particular, whether the MSS 102 is to be considered as having left the network.

For the embodiments, Paging Controller 114 starts a "Location Tracking Timer" and sets a "Location Tracking Counter" to a NetworkCacheDurationThreshold, 306. In various embodiments, both the Location Tracking Timer and the NetworkCacheDurationThreshold are configurable. The Location Tracking Timer specifies the frequency the MSS 102 is to be paged to determine whether the MSS 102 has left the network, and the NetworkCacheDurationThreshold specifies the number of time a MSS 102 is to fail to respond to a page before the MSS 102 is to be considered to have left the network. The exact values of these parameters are implementation dependent reflecting a calculated balance between aggressively pursuing the benefit of reduced memory requirement and search time, versus the risk of being in error and having to reestablish the AK Contexts.

Thus, in due course, on expiration of the Location Tracking Timer, Paging Controller 114 pages the MSS 102 at 308. If MSS 102 replies to the page at 310, Paging Controller 114 resets the Location Tracking Timer, and the method continues back at 306. However, if MSS 102 fails to reply to the page at 310, Paging Controller 114 decrements the Location Tracking Counter at 312. Paging Controller 114 further determines at 314 whether the Location Tracking Counter has been decremented to zero, i.e. the MSS 102 has failed to respond for the configurable threshold number of times. If not, Paging Controller 114 restarts the Location Tracking Timer at 316 and continues the method at 308. On the other hand, if MSS 102 has failed to respond for the configurable threshold number of times, Paging Controller 114 triggers Authenticator 108 to delete the PMK associated with the MSS 102 and to send the messages to the BSs 104 to delete AK and AK Context associated with the MSS 102, 318.

In various embodiments, each of said purging or delete may comprise marking an AK context as invalid and/or marking storage locations of a storage medium employed to store the AK context being purged or deleted as available for use to store another AK context or even other unrelated data.

In various embodiments, in lieu of Paging Controller 114 responding to Authenticator 108, which in turn informs BSs 104, Paging Controller 114 may respond to the requesting BS 104 instead, which in turn may inform Authenticator 108, which may then inform the other BSs 104.

Figure 4:
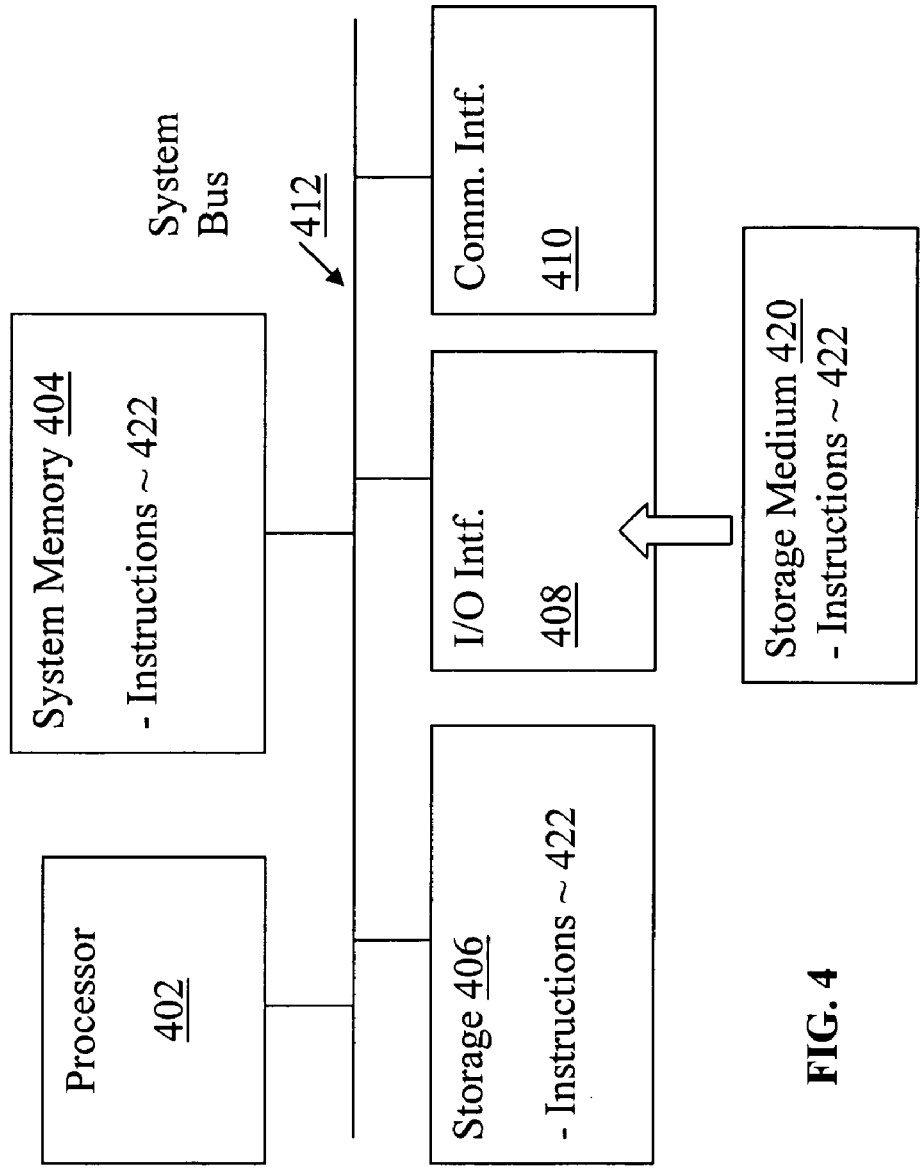
FIG. 4 illustrates an example computing device suitable for use as either a BS, the Authenticator or the Paging Controller of FIG. 1, including an article having programming instructions configured to enable the computing device to practice an applicable portion of the method of the present invention, in accordance with various embodiments.

FIG. 4 illustrates an example computing device suitable for use as either a BS, an Authenticator or a Page Controller, to practice the present invention, in accordance with various embodiments. The term "computing device" as used herein includes special as well as general purpose processor based computing devices. As shown, computing device 400 includes one or more processors 402 and system memory 404. Additionally, computing device 400 includes persistent storage 406, I/O device interfaces 408 and communication interfaces 410. In various embodiments, communication interface 410 may include one or more omnidirectional antennas.

The elements are coupled to each other via system bus 412, which represents one or more buses. In the case of multiple buses, they are bridged by one or more bus bridges (not shown). Each of these elements performs its conventional functions known in the art. In particular, system memory 404 and storage 406 are employed to store a working copy of the instructions 422 implementing the applicable logic of BS 104, Authenticator 108 or Paging Controller 114 earlier described. Instructions 422 may be organized as one or more software units (modules and/or tasks). The software unit or units implementing the applicable logic in each of BS 104, Authenticator 108 or Paging Controller 114 may be referred to as the "authentication module" of BS 104, Authenticator 108 or Paging Controller 114. The permanent copy of the instructions may be loaded into storage 406 in the factory, or in the field, through a distribution medium 420 or through one of communication interfaces 410. The constitution of these elements 402-412 are known, and accordingly will not be further described.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. Therefore, it is manifestly intended that this invention be limited only by the claims and the equivalents thereof.

What is claimed is:

1. A base station comprising:
a storage medium to store an authentication key context, including an uplink packet number and a downlink packet number that respectively correspond to a media access control (MAC) message received by the base station from a mobile subscriber station and a downlink MAC message transmitted to the mobile subscriber station from the base station, for an authentication key cached in the storage medium and associated with authenticating the mobile subscriber station to be serviced in a coverage area of an access network, the mobile subscriber station to be serviced while the authentication key remains cached in the storage medium for an established lifetime of a pairwise master key from which the authentication key is derived; and
an authentication module coupled to the storage medium and configured to purge the authentication key and the authentication key context from the storage medium, prior to expiration of the established lifetime of the pairwise master key, based at least in part on learning of a determination that the mobile subscriber station failed to respond to a plurality of pages, wherein a predefined period of time elapses between consecutive pages of the plurality of pages, and the plurality of pages is greater than a predetermined threshold number of pages.

2. The apparatus of claim 1, wherein the authenticator module is configured to cause the determining to be performed by requesting a paging controller of the access network to perform the determining, and said learning comprises receiving a response from an associated authenticator notifying the base station the paging controller has determined the mobile subscriber station has failed to respond to a plurality of pages.

3. The apparatus of claim 1, wherein each of said purging comprises at least one of marking an authentication key context as invalid and marking storage locations of the storage medium employed to store the authentication key context being purged as available for use to store another authentication key context.

4. A method comprising:
receiving a request from a first base station or an authenticator associated with the first base station of an access network to determine whether a mobile subscriber station has left one or more coverage areas of the access network;
paging, by a paging controller of the access network, the mobile subscriber station a plurality of times, with a predefined period of time elapsing between consecutive pages; determining that the mobile subscriber station has left one or more coverage areas based on a failure of the mobile subscriber station to respond to a predetermined number of pages; and
on determining the mobile subscriber station has left the one or more coverage areas, informing, by the paging controller, the first base station, a second base station of the access network and the authenticator of the determining that the mobile subscriber station has left the one or more coverage areas to trigger the first and second base stations each to delete an authentication key and authentication key context associated with the mobile subscriber station and further trigger the authenticator to delete a pairwise master key from which the authentication key is derived and that is associated with the mobile subscriber station.

5. The method of claim 4, wherein the paging further comprises setting and resetting a timer based at least in part on elapsing, the resetting being performed after each page.

6. The method of claim 4, wherein the paging further comprises setting and resetting a counter based at least in part on the elapsing, and decrementing a counter each time the mobile subscriber station failed to respond to a page.

7. An article of manufacture comprising:
a non-transitory storage medium to store an authentication key context, including an uplink packet number and a downlink packet number that respectively correspond to a media access control (MAC) message received by a base station from a mobile subscriber station and a downlink MAC message transmitted to the mobile subscriber station from the base station, for an authentication key associated with authenticating the mobile subscriber station to be serviced in a coverage area of an access network, the mobile subscriber station to be serviced while the authentication key remains cached in the storage medium for an established lifetime of a pairwise master key from which the authentication key is derived; and
programming instructions stored in the storage medium and configured to program the base station to purge the authentication key and the authentication key context from the storage medium, prior to expiration of the established lifetime of the pairwise master key, based at least in part on learning of a determination that the mobile subscriber station failed to respond to a plurality of paging messages, wherein a predefined period of time elapses between consecutive paging messages of the plurality of paging messages, and the plurality of paging messages is greater than a predetermined threshold number of paging messages.

8. The article of claim 7, wherein the programming instructions are configured to enable the base station to request that a paging controller perform the determining, and to learn of the determination by receiving a response from an associated authenticator notifying the base station the paging controller has determined the mobile subscriber station has failed to respond to the plurality of paging messages.

9. A system comprising:
a plurality of omnidirectional antennas;
a base station coupled to one or more of the antennas, and configured to store, in a storage medium, an authentication key context, including an uplink packet number and a downlink packet number that respectively correspond to a media access control (MAC) message received by the base station from a supplicant and a downlink MAC message transmitted to the supplicant from the base station, for an authentication key associated with authenticating the supplicant to be serviced in a coverage area of an access network, the supplicant to be serviced while the authentication key remains cached in the storage medium for an established lifetime of a pairwise master key from which the authentication key is derived;
purge the authentication key and the authentication key context from the storage medium, prior to expiration of the established lifetime of the pairwise master key, based at least in part on learning of a determination that the supplicant failed to respond to a plurality of pages, wherein a predefined period of time elapses between consecutive pages of the plurality of pages, and the plurality of pages is greater than a predetermined threshold number of pages,
a paging controller coupled to the base station, and configured to:
determine for the base station that the supplicant has failed to respond to the plurality of pages; and
trigger purging of the authentication key and the authentication key context in the base station and purging of a pairwise master key, stored in an authenticator, associated with the supplicant, and
an authenticator coupled to the base station and configured to notify a plurality of base stations associated with the authenticator to purge corresponding authentication key contexts of the supplicant stored in corresponding storage medium of the plurality of base stations, prior to expiration of the established lifetime of the pairwise master key from which the corresponding authentication keys are derived, upon learning of the determination that the supplicant failed to respond to the plurality of pages.

10. The system of claim 9, wherein the paging controller is further configured to set and reset a timer to establish that the predefined period of time elapses between consecutive pages of the plurality of pages.

11. The system of claim 9, wherein the paging controller is configured to decrement a counter each time the supplicant fails to respond to a page to establish that the plurality of pages is greater than a predetermined threshold number of pages.

* * * * *

UNITED STATES PATENT AND TRADEMARK OFFICE
CERTIFICATE OF CORRECTION

| | | |
|---|---|---|
| PATENT NO. | : 8,031,872 B2 | Page 1 of 1 |
| APPLICATION NO. | : 11/329911 | |
| DATED | : October 4, 2011 | |
| INVENTOR(S) | : Sanjay Bakshi | |

It is certified that error appears in the above-identified patent and that said Letters Patent is hereby corrected as shown below:

Column 6
Line 32, "2. The apparatus of claim 1,..." should read --2. The base station of claim 1,...--.

Column 6
Line 40, "3. The apparatus of claim 1,..." should read --3. The base station of claim 1,...--.

Signed and Sealed this
Twelfth Day of February, 2013

Teresa Stanek Rea
*Acting Director of the United States Patent and Trademark Office*